United States Patent
Albrecht et al.

(10) Patent No.: US 8,665,549 B2
(45) Date of Patent: Mar. 4, 2014

(54) METHOD FOR CREATING BURST MAGNITUDE SERVO PATTERNS WITH UNIPOLAR BITS ON A MAGNETIC MEDIA OF A MAGNETIC DATA RECORDING SYSTEM

(75) Inventors: Thomas R. Albrecht, San Jose, CA (US); Toshiki Hirano, San Jose, CA (US); Tetsuo Semba, San Jose, CA (US); Xiaotian Sun, San Jose, CA (US)

(73) Assignee: HGST Netherlands B.V., Amsterdam (NL)

( * ) Notice: Subject to any disclaimer, the term of this patent is extended or adjusted under 35 U.S.C. 154(b) by 196 days.

(21) Appl. No.: 13/249,041

(22) Filed: Sep. 29, 2011

(65) Prior Publication Data
US 2013/0083420 A1  Apr. 4, 2013

(51) Int. Cl.
G11B 21/02  (2006.01)
G11B 5/82  (2006.01)

(52) U.S. Cl.
USPC ............................................. 360/75; 360/135

(58) Field of Classification Search
None
See application file for complete search history.

(56) References Cited

U.S. PATENT DOCUMENTS

| | | | | |
|---|---|---|---|---|
| 5,063,545 A | * | 11/1991 | Nishida | 369/30.15 |
| 5,541,784 A | | 7/1996 | Cribbs et al. | |
| 5,771,131 A | * | 6/1998 | Pirzadeh | 360/77.08 |
| 6,519,107 B1 | * | 2/2003 | Ehrlich et al. | 360/75 |
| 6,751,035 B1 | | 6/2004 | Belser | |
| 7,403,353 B2 | | 7/2008 | Tagami et al. | |
| 7,643,234 B2 | | 1/2010 | Albrecht et al. | |
| 7,729,073 B2 | | 6/2010 | Yamamoto | |
| 7,848,040 B2 | | 12/2010 | Yamamoto | |
| 7,944,643 B1 | * | 5/2011 | Jiang et al. | 360/77.02 |
| 2009/0027802 A1 | | 1/2009 | Kim | |
| 2009/0147402 A1 | | 6/2009 | Sul et al. | |
| 2010/0067145 A1 | | 3/2010 | Pokharel et al. | |
| 2010/0128583 A1 | | 5/2010 | Albrecht et al. | |
| 2010/0142085 A1 | | 6/2010 | Coker et al. | |

FOREIGN PATENT DOCUMENTS

| | | |
|---|---|---|
| JP | 20090158013 A | 7/2009 |
| JP | 2009187640 A | 8/2009 |
| WO | 98/16922 A1 | 4/1998 |

OTHER PUBLICATIONS

Han, Y. et al., "Evaluating Track-Following Servo Performance of High-Density Hard Disk Drives Using Patterned Media," 2009 IEEE, IEEE Transactions on Magnetics, vol. 45, No. 12, Dec. 2009, pp. 5352-5359.

Zhang, S. et al., "Effect of Read Head Scaling on Servo and Data Signal Characteristics for Staggered Two-Row-per-Track Bit-Patterned-Media Recording," 2010 IEEE, IEEE Transactions on Magnetics, vol. 46, No. 6, Jun. 2010, pp. 1645-1648.

* cited by examiner

*Primary Examiner* — Thang Tran
(74) *Attorney, Agent, or Firm* — Zilka-Kotab, PC

(57) ABSTRACT

A magnetic data storage system having a magnetic disk having burst patterns for providing a position error signal (PES) wherein each magnetic burst pattern is offset from an adjacent burst pattern by ¼ track pitch. All of the magnetic bits of the burst patterns can be unipolar magnetized, and the bits of each burst pattern can be aligned with one another in radial and circumferential direction. The magnetic media can be a bit patterned media wherein the magnetic bits of the burst patterns are magnetically isolated portions separated by non-magnetic spaces or non-magnetic material.

16 Claims, 12 Drawing Sheets

METHOD FOR CREATING BURST MAGNITUDE SERVO PATTERNS WITH UNIPOLAR BITS ON A MAGNETIC MEDIA OF A MAGNETIC DATA RECORDING SYSTEM

FIELD OF THE INVENTION

The present invention relates to magnetic data recording and more particularly to a method for manufacturing a magnetic data storage system having a patterned media with ¼ track offset unipolar servo bust patters.

BACKGROUND OF THE INVENTION

Magnetic recording hard disk drives with patterned magnetic recording media have been proposed to increase data density. In patterned media, the magnetic recording layer on the disk is patterned into small isolated data islands such that there is a single magnetic domain in each island or "bit". The single magnetic domains can be a single grain or consist of a few strongly coupled grains that switch magnetic states in concert as a single magnetic volume. This is in contrast to conventional continuous media wherein a single "bit" may have multiple magnetic domains separated by domain walls. To produce the required magnetic isolation of the patterned islands, the magnetic moment of the spaces between the islands must be destroyed or substantially reduced so as to render these spaces essentially nonmagnetic. Alternatively, the patterned media may be fabricated so that that there is no magnetic material in the spaces between the islands.

Like conventional non-patterned or continuous-media disks, patterned-media disks also have non-data servo sectors that are used for read/write head positioning. The non-data servo sectors in patterned-media disks contain discrete islands separated by nonmagnetic spaces. The servo islands are patterned into a position error signal (PES) field that generates a servo readback signal that is demodulated into a PES for positioning the read/write head to the desired data track and maintaining it on track.

Several techniques have been proposed for fabricating patterned-media disks, including conventional lithography, direct-write electron-beam (e-beam) lithography, nanoimprinting, and guided self-assembly. These techniques are described in numerous references, including Terris et al., "TOPICAL REVIEW: Nanofabricated and self-assembled magnetic structures as data storage media", J. Phys. D: Appl. Phys. 38 (2005) R199-R222. In nanoimprinting, a master template is fabricated, typically by direct e-beam writing, to have the desired pattern of discrete islands. The master template is pressed against a resist film on the disk substrate and subsequent etching steps of the substrate result in a patterned disk substrate onto which the magnetic layer is deposited. In guided self-assembly, a substrate is topographically patterned or the substrate surface is selectively chemically modified so that nanostructures can form in some areas and not others. Self-assembling block copolymers have been proposed for creating periodic nanometer-scale features that can be used to form the discrete islands. In guided self-assembly, the resulting discrete islands are typically formed as a hexagonal-close-packed (HCP) array. There are numerous references describing self-assembling block copolymers, including U.S. Pat. No 7,347,953 B2 and Kim et al., "Rapid Directed Self-Assembly of Lamellar Microdomains from a Block Copolymer Containing Hybrid", Proc. of SPIE Vol. 6921, 692129, (2008).

Patterned-media disks, especially those with self-assembled HCP arrays of discrete islands, present a unique problem in servo-writing. Because the discrete islands are formed during a separate disk fabrication process, when the disks are mounted on the rotatable spindle of the servowriter (or the spindle of the disk drive if servowriting is done in the drive) the concentric data tracks can never be perfectly aligned with the center of rotation of the spindle. Also, the disk fabrication process may itself result in the data tracks not being perfectly concentric. Thus if the disk is rotated with the servowriter write head held at a fixed radial position from the center of rotation, the write head will typically traverse multiple tracks as the servo sectors pass the head during one disk rotation. This makes it impossible during the servowriting process for the head to magnetize the islands in the servo sectors according to the desired pattern.

What is needed is a method for servowriting patterned-media magnetic recording disks that have discrete magnetizable islands in the servo sectors that must be magnetized according to a desired pattern.

SUMMARY OF THE INVENTION

The present invention provides a magnetic media for use in a magnetic data storage system. The magnetic media includes a magnetic disk having a plurality of data tracks each having a centerline, the distance between the centerlines of adjacent data tracks defining a track pitch. A first servo burst pattern is formed on the magnetic disk, and a second servo burst pattern is formed on the magnetic disk, the second servo burst pattern being offset from the first burst pattern by ¼ of the track pitch.

The ¼ track offset of the burst patterns advantageously allows a position error signal (PES) to be demodulated from the burst patterns even when the burst patterns are unipolar magnetized (e.g. all magnetized in the same direction). In addition, the ¼ offset burst patterns can be used in a bit patterned media where all of the magnetic bits of each burst pattern are radial and circumferentially aligned with one another.

These and other features and advantages of the invention will be apparent upon reading of the following detailed description of preferred embodiments taken in conjunction with the Figures in which like reference numerals indicate like elements throughout.

BRIEF DESCRIPTION OF THE DRAWINGS

For a fuller understanding of the and advantages of this invention, as well as the preferred mode of use, reference should be made to the following detailed description read in conjunction with the accompanying drawings which are not to scale.

DETAILED DESCRIPTION OF THE PREFERRED EMBODIMENTS

The following description is of the best embodiments presently contemplated for carrying out this indention. This description is made for the purpose of illustrating the general principles of this invention and is not meant to limit the inventive concepts claimed herein.

Figure 1:
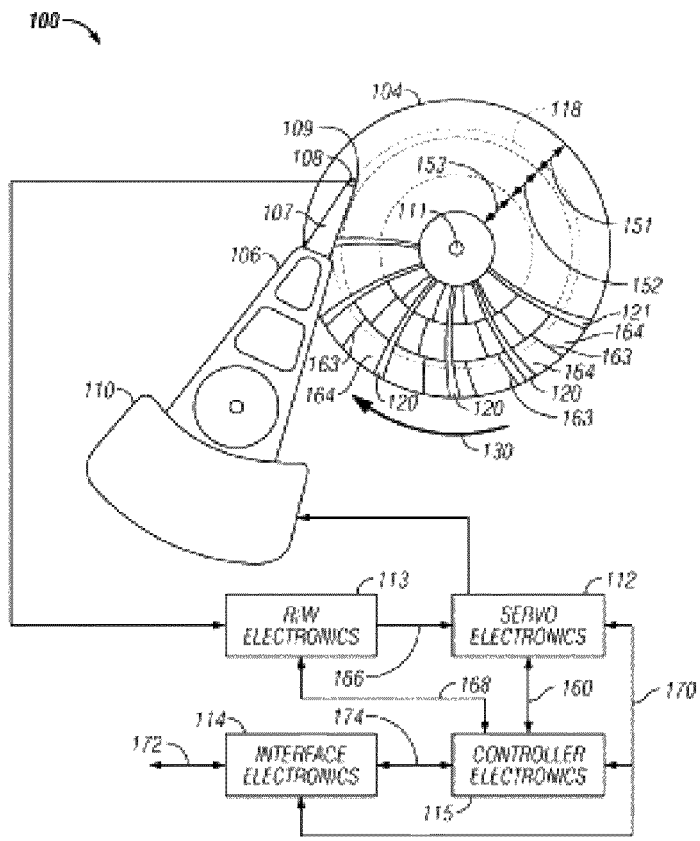
FIG. 1 is a schematic illustration of a disk drive system in which the invention might be embodied.

FIG. 1 is a schematic of a conventional magnetic recording disk drive and illustrates the magnetic recording disk with the non-data regions, specifically the servo sectors for positioning the recording heads on the data tracks and the synchronization fields for enabling the recording heads to read and write data in the data sectors. The disk drive, designated generally as 100, includes the magnetic recording disk 104, a radial voice coil motor (VCM) actuator 110, an actuator arm 106, a suspension 107, a head carrier or air-bearing slider 108 and a recording head 109. The recording head 109 is typically a combination of an inductive write head with a magnetoresistive read head (also called a read/write head) and is located on the trailing end or end face of slider 108. Slider 108 is supported on the actuator arm 106 by a suspension 107 that enables the slider to "pitch" and "roll" on an air-bearing generated by the disk 104 as it rotates in the direction of arrow 130. Only one disk surface with associated slider and recording head is shower in FIG. 1, but there are typically multiple disks stacked on a hub that is rotated by a spindle motor, with a separate slider and recording head associated with each surface of each disk.

Figure 2:
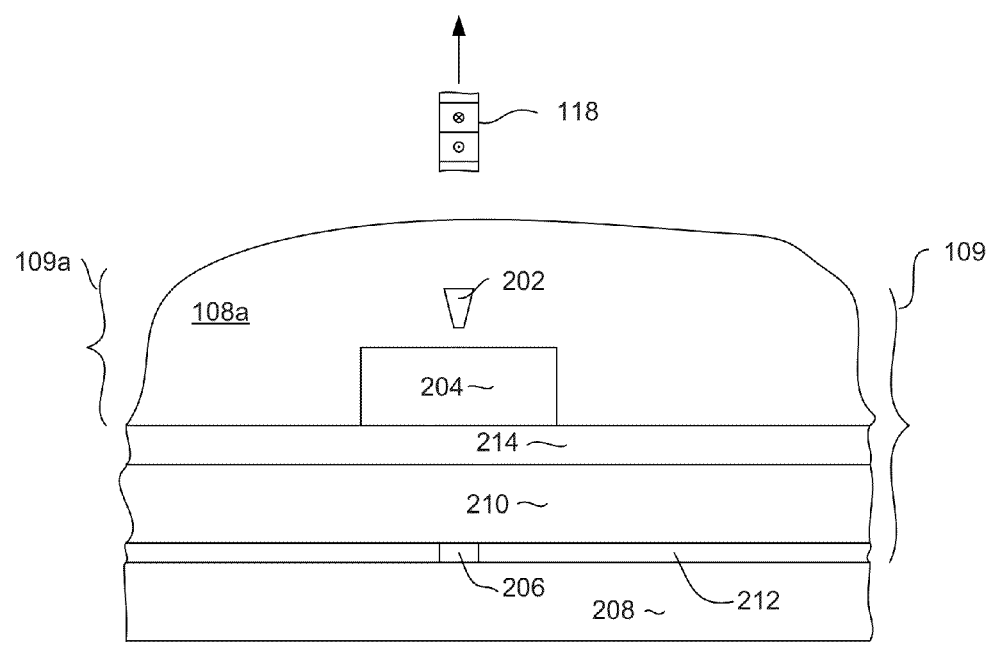
FIG. 2 is an ABS view of a prior art magnetic head.

FIG. 2 is a view showing the disk-facing surface 108a of slider 108 and the ends of head 109 as viewed from the surface of disk 104 (FIG. 1) superimposed with a portion of data track 118. The write head 109a includes magnetic write pole 202 and a magnetic return pole 204. As can be seen, the write pole 202 has across section at the air bearing surface that is much smaller than that of the write pole 204. The write head 109a also includes an electrically conductive, non-magnetic write coil (not shown) that generates a magnetic field that results in a magnetic write field being emitted from the end of the write pole 202. Because the write pole 202 has a small cross section, the magnetic write field emitted from the write pole 202 is strong and dense. This magnetic write field magnetizes the magnetic media 104 (FIG. 1). The magnetic write field passes through the media 104 and returns to the return pole 304 where it is sufficiently spread out and weak that it does not erase previously recorded data.

The head 109 can also include a magnetoresistive sensor 206 sandwiched between first and second magnetic shields 208, 210. An electrically insulating fill layer 212 can be provided between the shields in areas removed from the sensor 206. A non-magnetic, electrically insulating gap layer 214 can be provided between the shield 210 and write head 109a.

Referring again to FIG. 1, the disk 104 has a center of rotation 111 and is rotated in direction 130. The disk 104 has a magnetic recording layer with radially-spaced concentric data tracks, one of which is shown as track 118. Each data track has a reference index 121 indicating the start-of-track. The disk drive is illustrated as a zone-bit-recording (ZBR) disk drive because the data tracks are grouped radially into a number of annular data bands or zones, three of which are shown as zones 151, 152 and 153, but the invention is fully applicable to a disk drive that does not use ZBR, in which case the disk drive would have only a single data zone. Within each zone, the tracks are also circumferentially divided into a number of data sectors, such as typical data sectors 164 in the radially outer data zone. Each data sector 164 is preceded by a synchronization (sync) field, such as typical sync fields 163. The sync fields 163 are detectable by the read head for enabling synchronization of reading and writing the data bits in the data sectors 164.

Each data track also includes a plurality of circumferentially or angularly-spaced servo sectors 120 that contain positioning information detectable by the read head for moving the head 109 to desired data tracks and maintaining the head 109 on the data tracks. The servo sectors in each track are aligned circumferentially with the servo sectors in the other tracks so that they extend across the tracks in a generally radial direction, as represented by generally radially-directed servo sectors 120. The servo sectors 120 have a generally arcuate shape in the generally radial direction that generally replicates the path of the head 109 as it is moved across the disk by the radial actuator 110. The servo sectors 120 are non-data regions on the disk that are magnetized once, typically during manufacturing or formatting of the disk, and are not intended to be erased during normal operation of the disk drive.

The electronics associated with disk drive 100 include read/write (R/W) electronics 113, servo electronics 112, controller electronics 115 and interface electronics 114. In the operation of disk drive 100, the R/W electronics 113 receives signals from head 109 and passes servo information from the servo sectors 120 to servo electronics 112 and data signals from the data sectors 164 to controller electronics 115. Servo electronics 112 uses the servo information to produce a current at 140 that drives VCM actuator 110 to position head 109. Interface electronics 114 communicates with a host system (not shown) over interface 172, passing data and command information. Interface electronics 114 also communicates with controller electronics 115 over interface 174. In the operation of disk drive 100, interface electronics 114 receive a request for reading from or writing to the data sectors 164 over interface 172. Controller electronics 115 receive a list of requested data sectors from interface electronics 114 and converts them into a set of numbers that uniquely identify the disk surface, track and data sector. The numbers are passed to servo electronics 112 to enable positioning head 109 to the appropriate data sector.

If the disk drive is a "headerless" architecture disk drive, meaning that the data sectors 164 do not contain unique data sector addresses that are required to be read before data can be read from or written to the data sectors, then once the servo electronics 112 has positioned head 109 over the appropriate data track, servo electronics 112 begins executing sector computations to locate and identify the desired data sector. In brief, in the headerless architecture approach, a servo timing mark (STM) at the beginning of the servo sectors 120 is used to locate servo sectors, and a count of STMs from a servo sector containing an index mark 121 uniquely identifies each servo sector. Once the desired data sector is thus identified, the sync field preceding that data sector is detected to control the timing of data bits read from the data sector or data bits written to the data sector.

Conventional magnetic recording disk drives use disks with "continuous" media, meaning that the magnetic recording layer is a continuous film of magnetizable material. In conventional continuous-media disks the concentric data tracks are not physically separated from one another and are not pre-formed in the recording layer, but are formed when the write fields from the write head create the magnetizations in the continuous magnetic layer. A continuous-media disk may also be a "discrete-track" disk, meaning that the concentric data tracks of continuous magnetic material are radially separated from one another by concentric nonmagnetic guard bands. Discrete-track magnetic recording disks are known in the art, as described for example in U.S. Pat. No. 4,912,585. In a discrete-track disk, the nonmagnetic guard bands may be trenches or grooves, or formed of nonmagnetic material, or contain magnetic material but have surfaces far enough below the surfaces of the data tracks to not adversely the readback signals from the data tracks.

Magnetic recording disks with "patterned" media have been proposed to increase the data density. In patterned media, the magnetizable material on the disk is patterned into small isolated islands such that there is a single magnetic domain in each island or "bit". The single magnetic domains can be a single grain or consist of a few strongly coupled grains that switch magnetic states in concert as a single magnetic volume. This is in contrast to conventional continuous media wherein a single "bit" may have multiple magnetic domains separated by domain walls. To produce the required magnetic isolation of the patterned islands, the magnetic moment of the spaces between the islands must be destroyed or substantially reduced so as to render these spaces essentially nonmagnetic. In patterned media, the data sectors as well as the nondata regions are patterned. However, it is also possible to fabricate a continuous-media disk wherein just the non-data regions are patterned. This type of continuous-media disk may have either conventional concentric data tracks, or discrete data tracks separated by nonmagnetic guard bands, but the non-data regions are patterned. An example of a discrete-track disk with patterned servo regions is described in U.S. Pat. No. 4,912,585.

Figure 3:
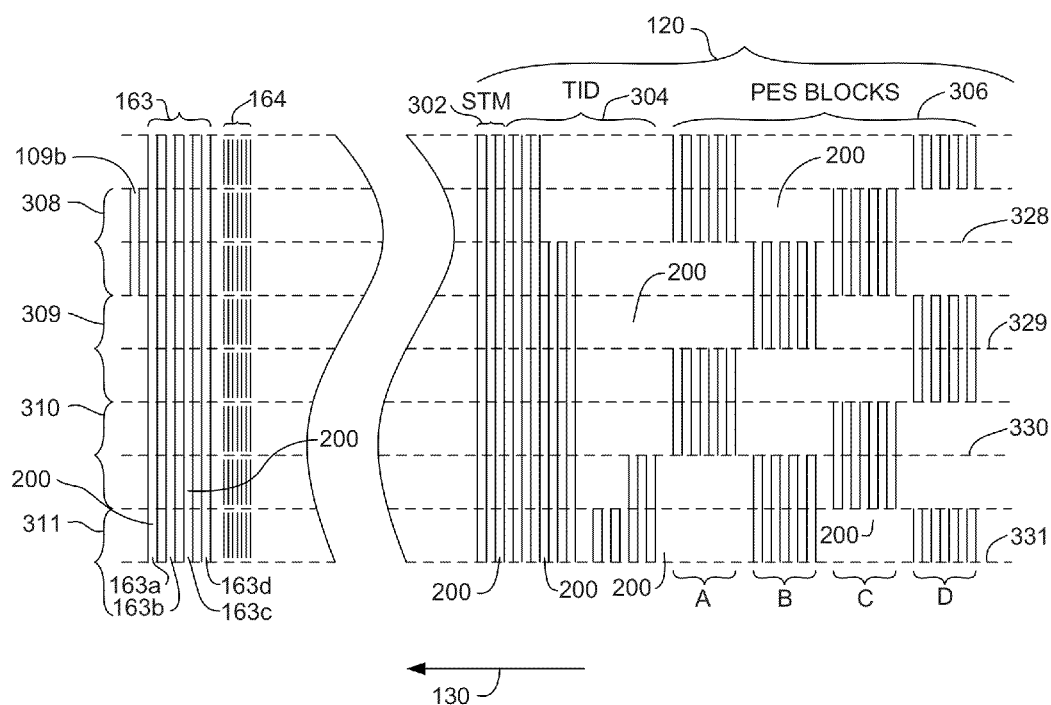
FIG. 3 is a view of a portion of a servo pattern of a prior art magnetic media.

FIG. 3 is a schematic showing a portion of a prior art disk with a sync field 163 and a servo sector 120 spanning several data tracks, as proposed in the prior art. Four full data tracks are depicted: 308, 309, 310 and half-track 311, each having a respective track centerline 328, 329, 330 and 331. The read head 109b is shown as positioned in data track 308 and will detect the islands in sync field 163 and servo sector 120 as the disk rotates in the direction of arrow 130.

The sync field 163 is depicted with four sync marks as magnetized non-data islands 163a-163d separated by non-magnetic spaces. The sync marks are stripes that extend across the data tracks in the radial direction, resulting in a single-frequency pattern suitable for locking a phase-locked-loop data clock prior to reading or writing data bits in the data sectors. The sync field 163 precedes the data sector 164, which shows several data islands, represented as solid lines.

The servo sector 120 is a conventional servo pattern of the type commonly used in sector servo systems and shows a greatly simplified pattern for clarity. The servo pattern includes several fields containing non-data islands, three of which are shown as servo-timing-mark (STM) field 302, track ID (TID) field 304 and position-error-signal (PES) field 306 depicted as the well-known quadrature pattern of four PES fields comprising groups of islands A-D. The PES islands in groups A-D are used to determine the fractional part of the radial position of the head. When the head is at the track centers the read-back signal amplitudes from the group A islands and the group B islands are equal. When the head is at the half-track positions the amplitudes from the group C islands and the group D islands are equal. As the head moves off-track the amplitudes from all the islands will increase or decrease. The amplitudes of the PES islands are decoded in servo electronics 112 and used to reposition the head.

As shown schematically in FIG. 3, the non-data islands (sync field 163 and servo sector 120) have a frequency substantially lower than the data islands (data sector 164). This is because for a given resolution of the read head 109b, a modern partial-response (PR) read channel in RAY electronics 113 can handle linear bit densities with a period several times greater than the resolution of the read head. However, to clearly resolve individual pulses, which is beneficial for data synchronization and PES decoding, the period of the non-data islands should be close to the resolution of the read head.

Figure 4:
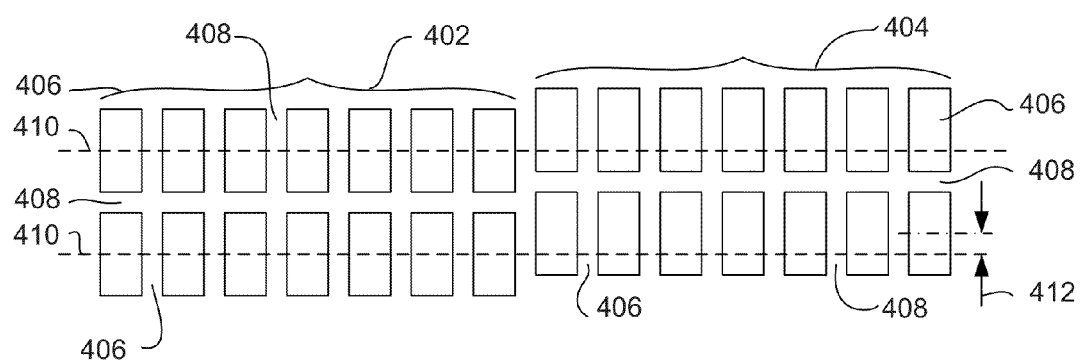
FIG. 4 is a view of position error signal burst patterns on a magnetic media according to an embodiment of the invention.

With reference now to FIG. 4, the present invention includes PES burst patterns 402, 404 that are ¼ track pitch offset from one another. As shown in FIG. 4, the first and second PES burst patterns 402, 404 each have magnetic bits 406. These magnetic bits 406 are DC magnetized in that all of the bits are magnetized in the same direction either into or out of the plane of the page in FIG. 4. As mentioned above, in order to increase data density, it is desirable to construct a magnetic disk as a bit patterned media. Therefore, in the FIG. 4 each magnetic bit 406 is a separate magnetic island and each of these islands are separated from one another by non-magnetic regions 408, which can be in the form of grooves or non-magnetic material.

In FIG. 4, the dashed lines 410 represent the location of a centerline of a data track. As can be seen, PES burst pattern 402 is arranged so that the bits or islands 406 are centered on the data tracks 410. By contrast however the adjacent PES burst pattern 404 is offset from the data track 404 by an offset 412 that is substantially ¼ of the track pitch. The track pitch is the distance between adjacent track centers 410. This offset 412 of the PES bursts 402, 404 allows servo electronics to evaluate the relative location of the head (e.g. 109b in FIG. 3) relative to the track centerline 410. In other words, the offset 412 allows the amount of head misalignment to be determined and corrected. Choosing the offset 412 to be about ¼ of the track pitch provides distinct advantages that will be discussed in greater detail herein below. While only two sets of burst patterns 402, 404 are shown in FIG. 4, more bust patterns could be used, such as for example four burst patterns.

In previous systems, in order to demodulate the position error signal for the entire range on a bit patterned media it would be necessary to use bi-polar bit patterns, which have to be written with expensive servo writing techniques or to use phase (chevron) patterns, which require a much more complicated channel function to demodulate. By placing adjacent burst patterns ¼ track pitch offset from one another the entire range of position error signal (PES) can be demodulated from DC erased unipolar bit patterns. This therefore, eliminates the need for servo writing of bipolar bits patterns, and it only requires simple magnetic demodulation.

Figure 5:
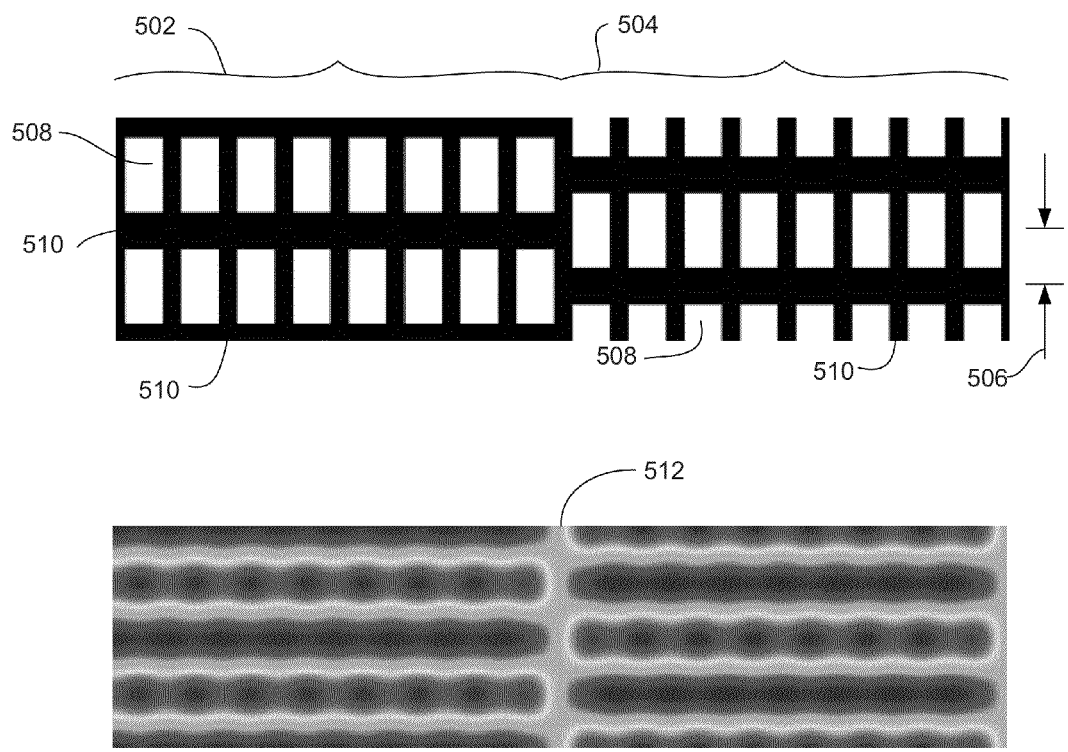
FIG. 5 is a view of a set of burst patterns having a ½ track offset and showing a magnetic image of such a set of burst patterns.

To illustrate the advantages of having burst patterns with ¼ offsets it is useful to consider a case where PES burst patterns are DC magnetized (having unipolar bits) and wherein the bursts are offset by ½ track. FIG. 5 shows such a structure having burst patterns 502 and 504 that have an offset 506 of ½ track pitch, Each if the burst patterns 502, 504 has magnetic unipolar bits 508 that are all magnetized in the same direction (e.g. into or out of the page) by a DC magnetization. In FIG. 5 the non-magnetic spaces 510 between the bits 508 are shown black, while the bits themselves 508 are shown in white. As those skilled in the art will appreciate, if the bits 508 are all magnetized in the same direction, then the magnetic transitions occur, not from one bit to another, but between a bit and a surrounding non-magnetic space 510, which serves a magnetic return path.

The image 512 shows the magnetic transitions as read from the above unipolar magnetized ½ track offset burst patterns 502, 504. As can be seen, the actual transitions appear to occur at the same radial location, and the offset 506 cannot be magnetically detected at all. Therefore, it can be seen, that burst patterns having a ½ track offset cannot be used in position error detection when using unipolar DC magnetized bits.

Figure 6:
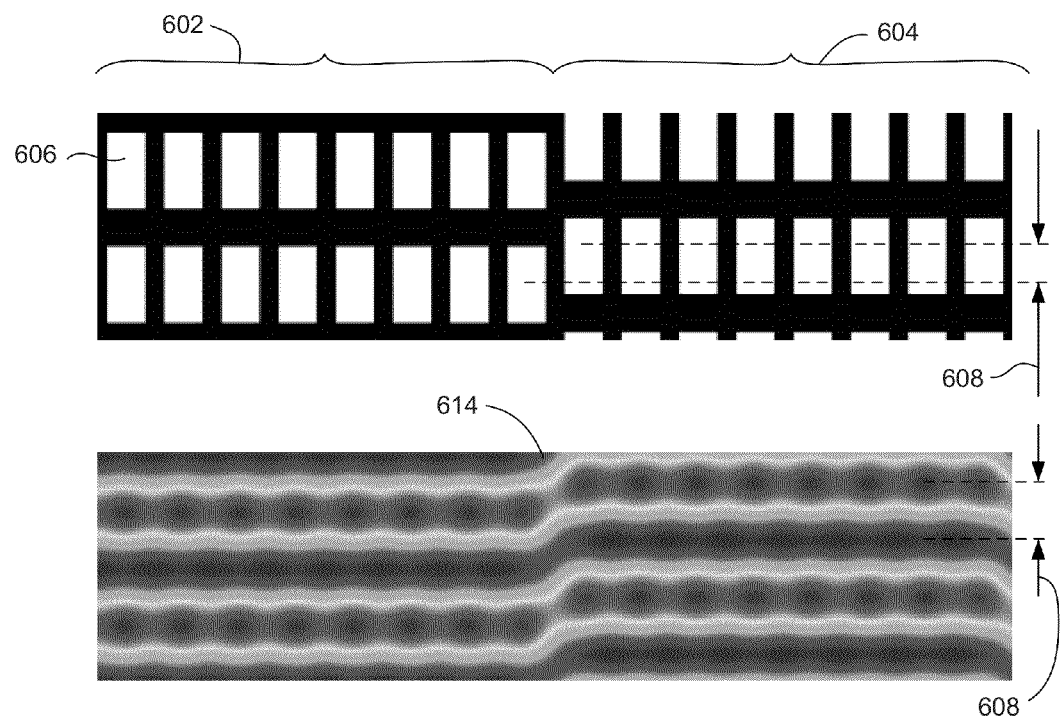
FIG. 6 is a view of a set of burst patterns having ¼ track offset and showing a magnetic image of such a set of burst patterns.

By contrast, FIG. 6 shows burst patterns 602, 604 having unipolar bits 606 arranged such that the burst patterns 602, 604 have a ¼ track offset 608. Again, the spaces 610 between the bits 606 are non-magnetic. The image 612 below shows the magnetic transitions read from such ¼ track unipolar burst patterns 602, 604. As can be seen, in the image 612, this offset can be easily detected and has a transition point 614 where the burst patterns change from on track bits to ¼ track offset bits.

Figure 7:
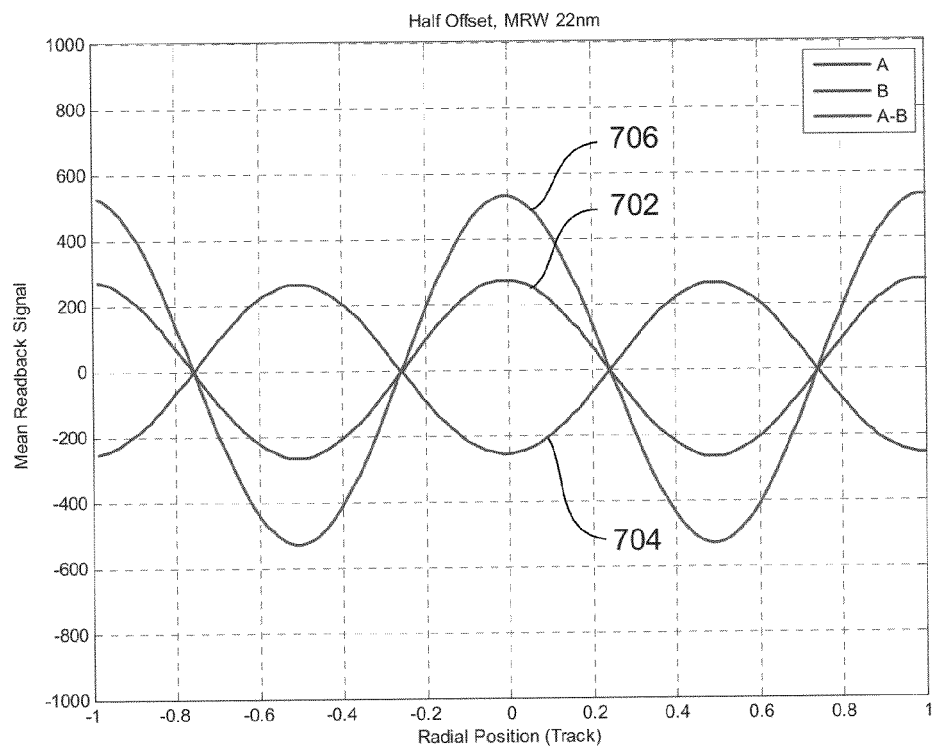
FIG. 7 is a graph showing signal responses for a ½ track offset burst patterns as a function of radial position for a 22 nm read width.
Figure 8:
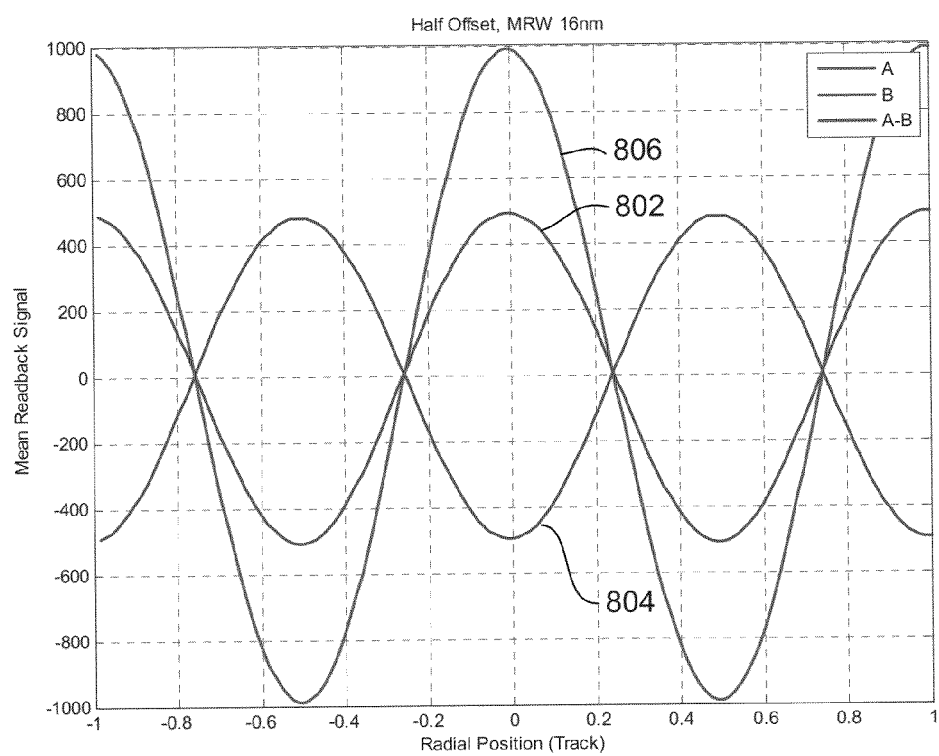
FIG. 8 is a graph showing signal responses for a ½ track offset burst patterns as a function of radial position for a 16 nm read width.
Figure 9:
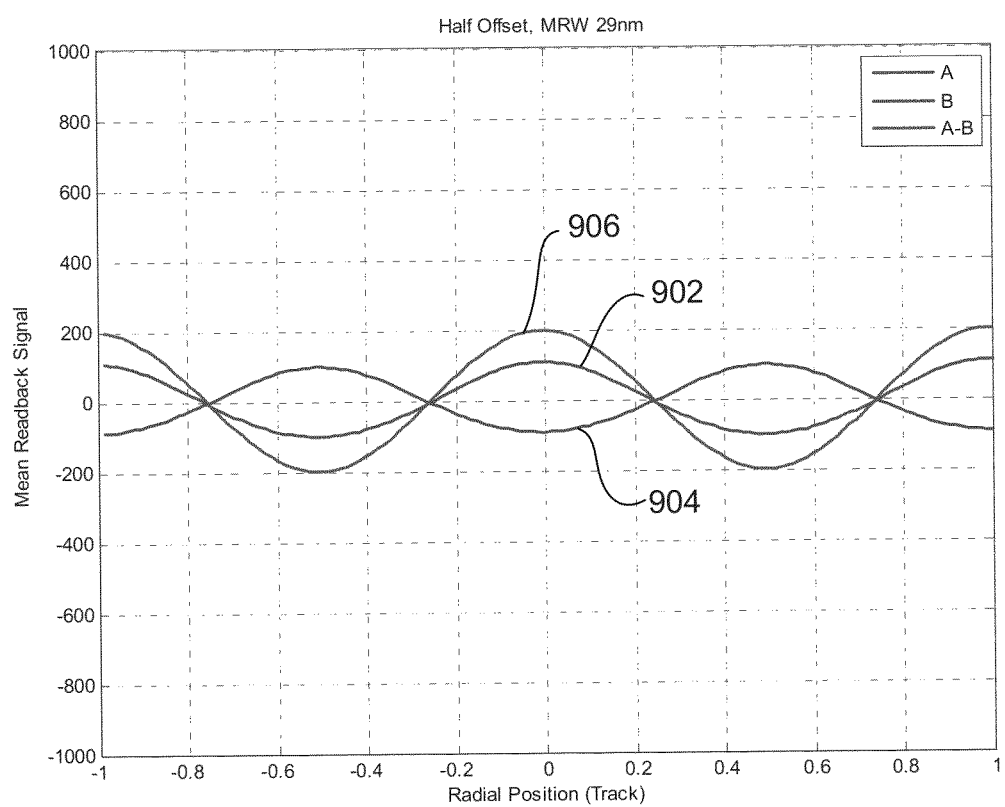
FIG. 9 is a graph showing signal responses for a ½ track offset burst patterns as a function of radial position for a 29 nm read width.

The graphs of FIGS. 7, 8 and 9 show the mean read-back signal for a set of burst patterns having a ½ track offset and unipolar bits as a function of radial position. FIG. 7 shows the response for a magnetic read width of 22 nm. FIG. 8 shows the response for a magnetic read width of 16 nm, and FIG. 9 shows the response for a magnetic read width of 29 nm. In the graph of FIG. 7, line 702 represents the response for one burst pattern (e.g. 502 of FIG. 5) and line 704 represents the response for a second burst pattern (e.g. 504 of FIG. 5) that is ½ track offset from the first burst pattern. Line 702 represents the signal response 702 minus the signal response 706. Similarly, in FIG. 8, line 802 represents the signal response of a first burst pattern, line 802 represents the signal response for a second burst pattern and line 806 represents signal response 802 minus signal response 804. In FIG. 9, line 902 shows the response for a first burst pattern, line 904 shows the response for a second burst pattern, and line 906 is the response 902 minus the response 904.

Figure 10:
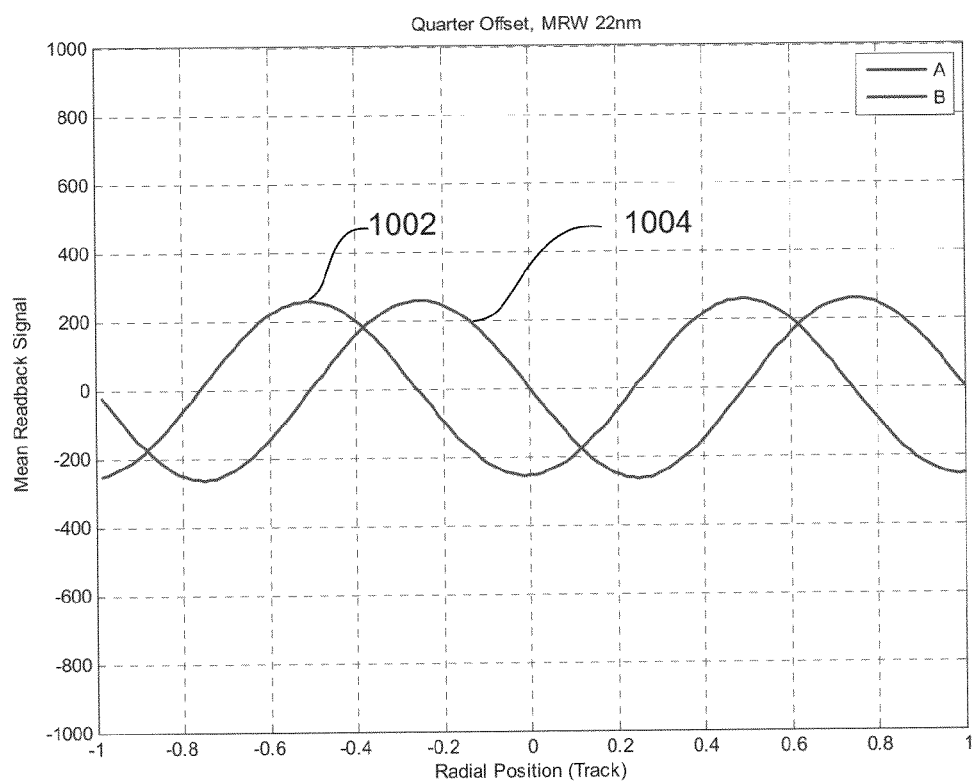
FIG. 10 is a graph showing signal responses for a ¼ track offset burst patterns as a function of radial position for a 22 nm read width.
Figure 11:
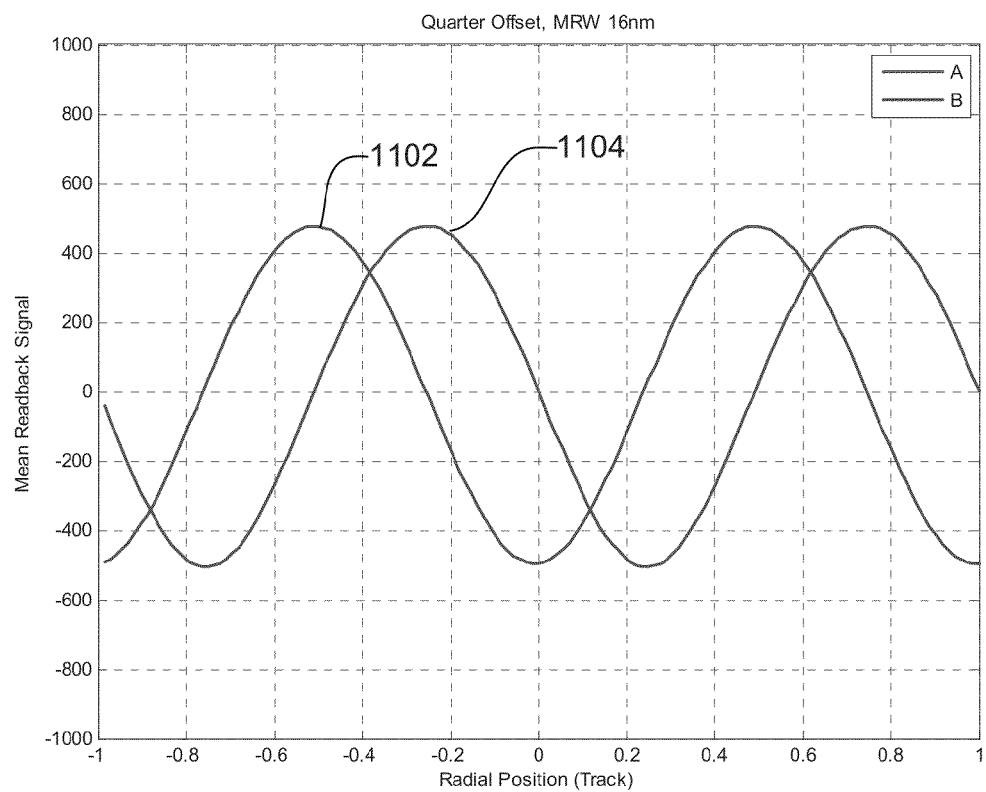
FIG. 11 is a graph showing signal responses for a ¼ track offset burst patterns as a function of radial position for a 16 nm read width.
Figure 12:
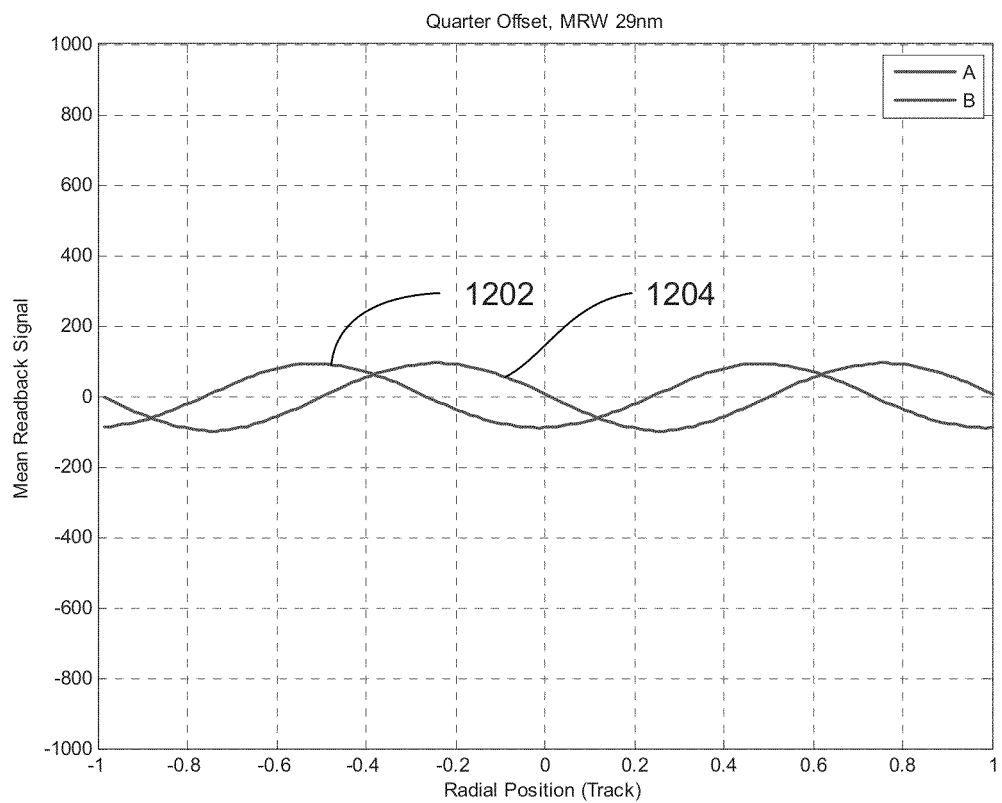
FIG. 12 is a graph showing signal responses for a ¼ track offset burst patterns as a function of radial position for a 29 nm read width.

By contrast FIGS. 10, 11 and 12 show signal responses as a function of radial head position for a media having unipolar burst patterns that are offset by ¼ of a data track pitch. Again FIG. 10 is for a magnetic read width of 22 nm, FIG. 11 is for a track width of 16 nm and FIG. 12 is for a magnetic read width of 29 nm. In FIG. 10 the line 1002 represents signal response for a first burst pattern and line 1004 represents the burst pattern for a second burst pattern. Similarly, in FIG. 11 line 1102 represents the signal response for a first burst pattern, and line 1104 represents the signal response for a second burst pattern. In FIG. 12, line 1102 represents the response for the first burst pattern and 1104 represents the response for the second burst pattern.

While various embodiments have been described above, it should be understood that they have been presented by way of example only and not limitation. Other embodiments falling within the scope of the invention may also become apparent to those skilled in the art. Thus, the breadth and scope of the invention should not be limited by any of the above-described exemplary embodiments, but should be defined only in accordance with the following claims and their equivalents.

What is claimed is:

1. A magnetic media for use in a magnetic data storage system, the magnetic media comprising:
 a magnetic disk having a plurality of data tracks each having a centerline, the distance between the centerlines of adjacent data tracks defining a track pitch;
 a first servo burst pattern formed on the magnetic disk; and
 a second servo burst pattern formed on the magnetic disk, the second servo burst pattern being offset from the first burst pattern by ¼ of the track pitch;
 wherein each burst pattern has magnetic bits that are all aligned with one another circumferentially and radially.

2. The magnetic disk as in claim 1 wherein the magnetic media is a bit patterned media having discrete magnetic bits separated by non-magnetic spaces.

3. The magnetic disk as in claim 1 wherein the magnetic media is a bit patterned media having discrete magnetic bits separated by non-magnetic material.

4. The magnetic disk as in claim 1 wherein the burst patterns are position error signal burst patterns located in a servo band on the magnetic disk.

5. The magnetic disk as in claim 1 wherein the first and second burst patterns are adjacent to one another.

6. A magnetic disk for magnetic data recording, comprising:
 a plurality of data tracks each having a centerline the distance between adjacent centerlines defining a track pitch;
 a plurality of burst patterns each offset from an adjacent burst pattern by a distance of ¼ track pitch;
 wherein each of the burst patterns has a plurality of magnetic bits that are all aligned with each other in both radial and circumferential directions.

7. The magnetic disk as in claim 6 wherein the magnetic disk has a servo sector and wherein the burst patterns are located within the same servo sector.

8. The magnetic disk as in claim 6 wherein each of the burst patterns has a plurality of bits that are all magnetized in the same direction.

9. The magnetic disk as in claim 6 wherein the magnetic disk is a bit patterned media.

10. The magnetic disk as in claim 6 wherein the magnetic disk is a bit patterned media having raised magnetic bit portions separated by non-magnetic spaces.

11. The magnetic disk as in claim 6 wherein the magnetic disk is a bit patterned media having raised magnetic bit portions separated by nonmagnetic material.

12. The magnetic disk as in claim 6, wherein:
 each of the burst patterns has a plurality of magnetic bits formed as discrete magnetic portions separated by non-magnetic spaces;
 the magnetic bits within each burst pattern are aligned with one another in a radial direction and in a circumferential direction; and
 all of the bits in each of the burst patterns is polarized in the same direction.

13. The magnetic disk as in claim 6, wherein:
 each of the burst patterns has a plurality of magnetic bits formed as discrete magnetic portions separated by non-magnetic material;
 the magnetic bits within each burst pattern are aligned with one another in a radial direction and in a circumferential direction; and all of the bits in each of the burst patterns is polarized in the same direction.

14. A magnetic data recording system, comprising:

a magnetic disk having a plurality of data tracks having centerlines, the distance between the centerlines defining a track pitch, the magnetic disk also having a plurality of burst patterns each offset from an adjacent burst pattern by a distance of ¼ track pitch;

a slider having a magnetic read sensor formed thereon;

circuitry connected with the read sensor for magnetically detecting a signal from the burst patterns, the circuitry being functional to demodulate the signal from the plurality of burst patterns to determine a location of the slider relative to at least one of the data tracks;

wherein the magnetic bits of each burst pattern are aligned with one another in a radial direction and in a circumferential direction.

15. The magnetic data recording system as in claim 14 wherein each of the burst patterns includes a plurality of magnetic bits, all of which are magnetized in the same direction.

16. The magnetic data recording system as in claim 15 wherein the magnetic disk is a bit patterned media and each of the plurality of magnetic bits of the burst patterns are isolated magnetic portions separated by non-magnetic spaces.

\* \* \* \* \*

UNITED STATES PATENT AND TRADEMARK OFFICE
CERTIFICATE OF CORRECTION

PATENT NO. : 8,665,549 B2  
APPLICATION NO. : 13/249041  
DATED : March 4, 2014  
INVENTOR(S) : Albrecht et al.

Page 1 of 1

It is certified that error appears in the above-identified patent and that said Letters Patent is hereby corrected as shown below:

In the Specification:

Column 3, line 24 delete "indention" insert --invention--;

Column 3, line 45 delete "head is shower" insert --head is shown--;

Column 3, line 54 delete "202 has across" insert --202 has a cross--;

Column 6, line 18 delete "channel in RAY" insert --channel in R/W--;

Column 7, line 3 delete "Each if" insert --each of--.

Signed and Sealed this  
Fourteenth Day of July, 2015

Michelle K. Lee  
*Director of the United States Patent and Trademark Office*